(12) United States Patent
Apostolopoulos et al.

(10) Patent No.: US 6,868,083 B2
(45) Date of Patent: Mar. 15, 2005

(54) METHOD AND SYSTEM FOR PACKET COMMUNICATION EMPLOYING PATH DIVERSITY

(75) Inventors: John G. Apostolopoulos, San Carlos, CA (US); Gregory W. Wornell, Wellesley, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 142 days.

(21) Appl. No.: 09/784,226

(22) Filed: Feb. 16, 2001

(65) Prior Publication Data

US 2002/0114332 A1 Aug. 22, 2002

(51) Int. Cl.$^7$ .......................... H04L 12/66; H04L 12/28

(52) U.S. Cl. ........................ 370/392; 370/352; 370/216

(58) Field of Search ................................ 370/216, 352, 370/389, 395.21, 401, 240, 248, 254, 255, 351, 392, 394, 396, 400; 455/276.1, 279.1, 429, 273, 216

(56) References Cited

U.S. PATENT DOCUMENTS

| | | | | |
|---|---|---|---|---|
| 5,109,390 A | * | 4/1992 | Gilhousen et al. | 370/335 |
| 5,521,910 A | * | 5/1996 | Matthews | |
| 5,790,541 A | * | 8/1998 | Patrick et al. | |
| 6,141,486 A | | 10/2000 | Lane et al. | |
| 6,477,117 B1 | * | 11/2002 | Narayanaswami et al. | 268/251 |
| 6,496,477 B1 | * | 12/2002 | Perkins et al. | 370/228 |

FOREIGN PATENT DOCUMENTS

| EP | 0550843 A1 | 7/1993 |
|---|---|---|
| WO | WO00/05898 | 2/2000 |
| WO | WO00/67469 | 11/2000 |

OTHER PUBLICATIONS

John G Apostolopoulos—"Error–Resilient Video Compression"—SPIE Conference on Multimedia Systems and Applications—Sep. 1999—SPIE vol. 3845—pp. 180–191.
John G Apostolopoulos—"Reliable Video Communication Over Lossy Packer Networks Using Multiple State Encoding and Path Diversity"—Visual Commiunications and Image Processing 2001—Proceedings of SPIE vol. 4310—pp. 392–409.
John G. Apostolopoulos—"Error–Resilient Video Compression Through the Use of Multiple States"—Hewlett–Packard Laboratories—2000 IEEE—pp. 352–355.
Amy R Reibman et al—"Transmission of Multiple Description and Layered Video Over aqn EGPRS Wireless Network"—AT&T Labs Research—2000 IEEE—pp. 136–139.

* cited by examiner

Primary Examiner—Afsar Qureshi

(57) ABSTRACT

Communication over lossy packet networks such as the Internet is hampered by limited bandwidth and packet loss. The present invention provides a path diversity transmission system for improving the quality of communication over a lossy packet network. The path diversity transmission system explicitly sends different subsets of packets over different paths, thereby enabling the end-to-end application to effectively see an average path behavior. Generally, seeing this average path behavior provides better performance than seeing the behavior of any individual random path. For example, the probability that all of the multiple paths are simultaneously congested is much less than the probability that a single path is congested. The resulting path diversity can provide a number of benefits, including enabling real-time multimedia communication and simplifying system design (e.g., error correction system design). Two exemplary architectures for achieving path diversity are described herein. The first architecture is based on source routing, and the second architecture is based on a relay infrastructure. The second architecture routes traffic through semi-intelligent nodes at strategic locations in the Internet, thereby providing a service of improved reliability while leveraging the infrastructure of the Internet.

34 Claims, 12 Drawing Sheets

METHOD AND SYSTEM FOR PACKET COMMUNICATION EMPLOYING PATH DIVERSITY

FIELD OF THE INVENTION

The present invention relates generally to communication of information across packet networks, and more particularly, to a method and system for packet communication employing path diversity.

BACKGROUND OF THE INVENTION

In conventional packet-based communication, the sender drops packets onto the network with a destination address (e.g., an Internet Protocol (IP) destination address), and the packets are delivered to that destination address.

This process is analogous to how mail (e.g., a letter) is delivered by the United States Post Office from sender to receiver. The Post Office personnel perform the delivery by using the destination address (e.g., street address, city, state and zip code). It is noted that the sender and the receiver have no control over how the letter gets from point A (the sender) to point B (the receiver). The Post Office personnel can use any number of different mail sorting and forwarding facilities and delivery vehicles (e.g., airplanes, mail trucks, etc.).

Similarly, in packet-based networks, the sending computer and receiving computer have no control over how the packets are delivered from point A to point B. This property has been instrumental to the growth of the Internet. Furthermore, this property is advantageous in that the infrastructure can be changed without affecting how point A communicates with point B. For example, the nodes can be added or deleted in the network and the network and sub-network configurations may be changed without affecting the communication between point A and point B.

Unfortunately, this property also limits the Internet to providing a "best effort" level of service. For example, in an electronic mail application, a sending application drops packets onto the network (e.g., the Internet) and hopes the packets are received by the intended receiver. It is noted that the Internet does not guarantee delivery of the packets to the receiver. Consequently, the sending application is uncertain of receipt of the packets until the sending application receives a confirmation of receipt from the receiving application. If a confirmation is not received within a certain time, the packets are re-sent by the sending application. This process continues until a confirmation of receipt is received by the sending application.

Unfortunately, there are many applications where the "best effort" level of service is not acceptable. For example, the use of re-transmissions may not be possible for one of several reasons. A first reason is that certain applications have a delay constraint (i.e., the information to be communicated has a time-bounded usefulness). In these applications, information that is not delivered in a timely manner is useless to the application. For real-time communication applications, information that is not timely is useless to the application. For example, an important video frame or audio packet that arrives late at the receiver cannot be used.

Examples of these applications include real-time video communications, such as real-time video telephone and video conferencing applications. Another example is one-way video, such as video games, where the video and audio information has delay constraints.

A second reason is that there may be an inability to use re-transmissions. Examples of these applications include one-way broadcast or multicast video or audio to a large number of receivers, where re-transmissions are not possible.

A third reason is that there may be certain applications where there is a lack of a feedback channel to request the re-transmission. In these applications, it is desirable to have a feedback-free communication (i.e., when there is no re-transmission available the application should provide reliable service even though there are packet losses).

Based on the foregoing, there remains a need for a method and system for a mechanism to provide reliable communication between a sender and a receiver across a packet network that overcomes the disadvantages set forth previously.

SUMMARY OF THE INVENTION

A method and system for communicating information from a sender to a receiver through a network by employing path diversity are provided.

According to one embodiment of the present invention, a system for communicating information is provided. The system includes a sender for receiving an information stream to be communicated. A multiple stream generator is provided for generating multiple streams in response to the information stream. The multiple streams include at least a first stream and a second stream. A path diversity unit is coupled to the multiple stream generator for receiving the first stream and the second stream and for sending the first stream through a first path in the network and sending the second stream through a second path in the network.

According to another embodiment of the present invention, a method for communicating information is provided. First, an information stream is received. Second, at least a first stream and a second stream are generated in response to the information stream. Next, the first stream is sent or transmitted through a first path in the network. The second stream is sent through a second path in the network.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE PREFERRED EMBODIMENT

A method and system for communicating information from a sender to a receiver through a packet network are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Communication over lossy packet networks such as the Internet is hampered by limited bandwidth and packet loss. The present invention provides a path diversity transmission system for improving the quality of communication over a lossy packet network. The path diversity transmission system explicitly sends different subsets of packets over different paths, as opposed to prior art approaches where the packets proceed along a single path. The path diversity transmission system enables the end-to-end application to effectively see an average path behavior (hereinafter referred to as path diversity).

Generally, seeing this average path behavior provides better performance than seeing the behavior of any individual random path. For example, the probability that all of the multiple paths are simultaneously congested is much less than the probability that a single path is congested. The resulting path diversity can provide a number of benefits, including enabling real-time multimedia communication and simplifying system design (e.g., error correction system design).

Two exemplary architectures for achieving path diversity are described herein. The first architecture is based on source routing, and the second architecture is based on a relay infrastructure. The second architecture routes traffic through semi-intelligent nodes at strategic locations in the Internet, thereby providing a service of improved reliability while leveraging the infrastructure of the Internet.

Network 100

Figure 1:
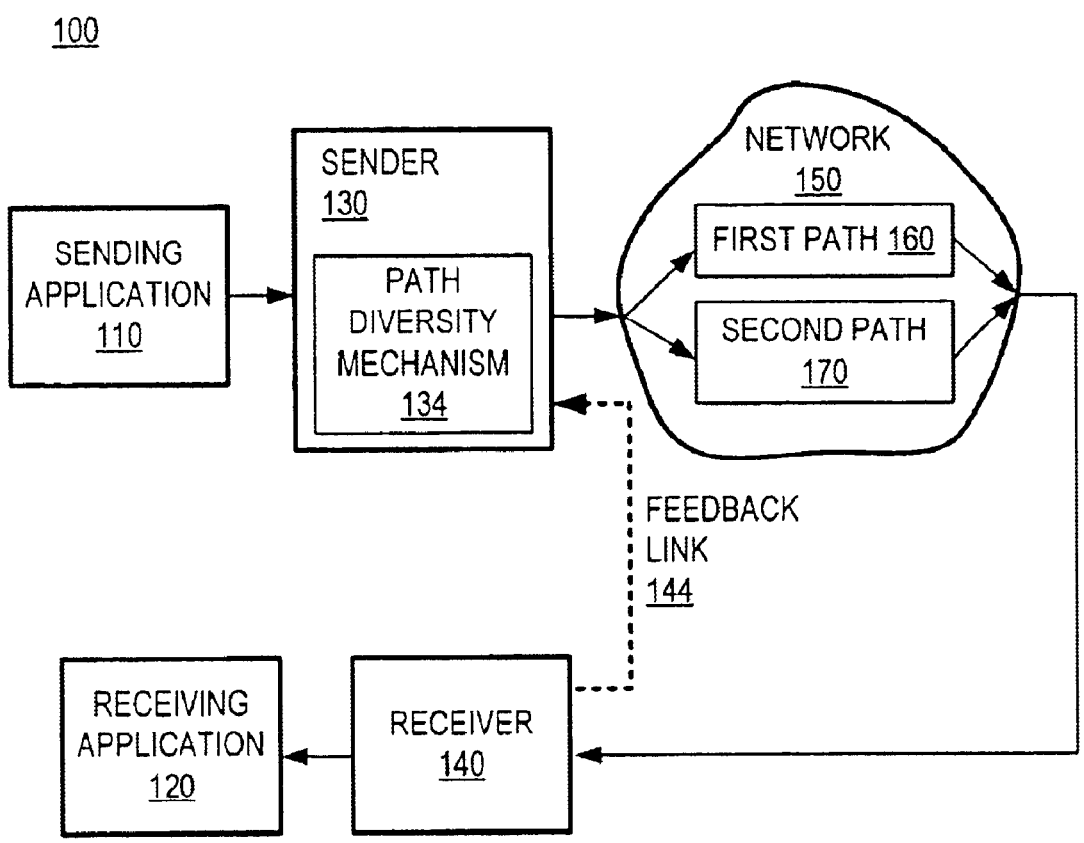
FIG. 1 is a block diagram of a packet network 100 in which the path diversity mechanism of the present invention can be implemented.

FIG. 1 is a block diagram of a network 100 in which the path diversity mechanism of the present invention can be implemented. The network 100 includes a sending application 110 that is sending information to a receiving application 120. For example, the sending application 110 and the receiving application 120 can be a real-time video telephone application or a video conferencing application. In this case, the applications 110 and 120 send and receive real-time video information and audio information.

A transmitting device 130 (hereinafter also referred to as "sender") is provided to receive the information, packetize the information, and to transmit the information through a network 150. The transmitting device 130 can be, for example, a router or other networking device. A receiving device 140 (hereinafter also referred to as "receiver") is provided to receive the packets, recover the information, and provide the information to the receiving application 120.

The information to be communicated between the sender 130 and the receiver 140 can be, but is not limited to, text information, file information, video information, audio information, voice information, and multimedia information. The information can also be time sensitive information (e.g., time-sensitive video information, time-sensitive audio information, and time-sensitive voice information, and time-sensitive multi-media information, time-sensitive control information, and any information with time-bounded usefulness).

The network 150 can be a cellular telephone network (e.g., Third Generation (3G) cellular system), a packet network, the Internet, an intranet, a local network (e.g., a local area network), and a wireless local area network (e.g., a wireless local area conforming to IEEE 802.11 specifications or a wireless local area network conforming to Bluetooth specifications).

The transmitting device 130 includes a path diversity mechanism 134 for explicitly sending at least a first subset of packets through a first path 160 and a second subset of packets through a second path 170. The path diversity mechanism 134 enables reliable communication (e.g., reliable multimedia communication) over packet networks, such as the Internet.

The path diversity mechanism 134 explicitly sends different subsets of packets over different paths, as opposed to the prior art approaches, where the packets proceed along a single path. By explicitly sending different subsets of packets over different paths, the path diversity mechanism 134 enables the end-to-end application (e.g., 110 and 120) to effectively see an average path behavior (hereinafter referred to as "path diversity"). Generally, seeing this average path behavior provides better performance than seeing the behavior of any individual random path. For example, the probability that all of the multiple paths are simultaneously congested is much less than the probability that a single path is congested. The use of multiple paths provides to the applications (e.g., 110 and 120) a virtual channel with improved properties as compared to the properties of a randomly chosen single path.

Although the path diversity mechanism 134 improves the performance of applications such as Web browsing and file transfer (e.g., ftp), the path diversity mechanism 134 is particularly suited to address the needs of real-time or broadcast multimedia communication and improve the performance thereof. Specifically, high quality multimedia communication (e.g. video or audio) requires high reliability in the packet-level communication channel (e.g. low packet loss rate and no outages). Since the path diversity system of the present invention provides improved packet-level communication quality, it can enable improved multimedia delivery. Specifically, conventional approaches to provide improved multimedia communication over a lossy packet network usually utilize a feedback channel and retransmission of lost packets. The use of retransmission requires that the received packets be buffered at the destination, thereby leading to an additional delay that is undesirable for real-time communications. The path diversity system of the present invention provides improved quality without requiring a feedback channel or retransmission opportunity. By not requiring re-transmission, the present invention also dramatically reduces the required buffering, thereby reducing the delay in the system. Consequently, the path diversity system of the present invention is more amenable for real-time communications than conventional approaches.

The application 110 can also provide to the sender 130 transmission parameters, such as information concerning how to packetize the information, information concerning what packets should be sent in which path, and information concerning the desired QoS requirements for each substream of packets. The transmission parameters are described in greater detail hereinafter with reference to FIG. 2.

The path diversity mechanism 134 is described in greater detail hereinafter with reference to FIGS. 2 and 4–12. Achieving path diversity by employing relays is described in greater detail hereinafter with reference to FIG. 4. Achieving path diversity by utilizing IP source routing is described in greater detail hereinafter with reference to FIGS. 5–6.

Transmitting Device 134

Figure 2:
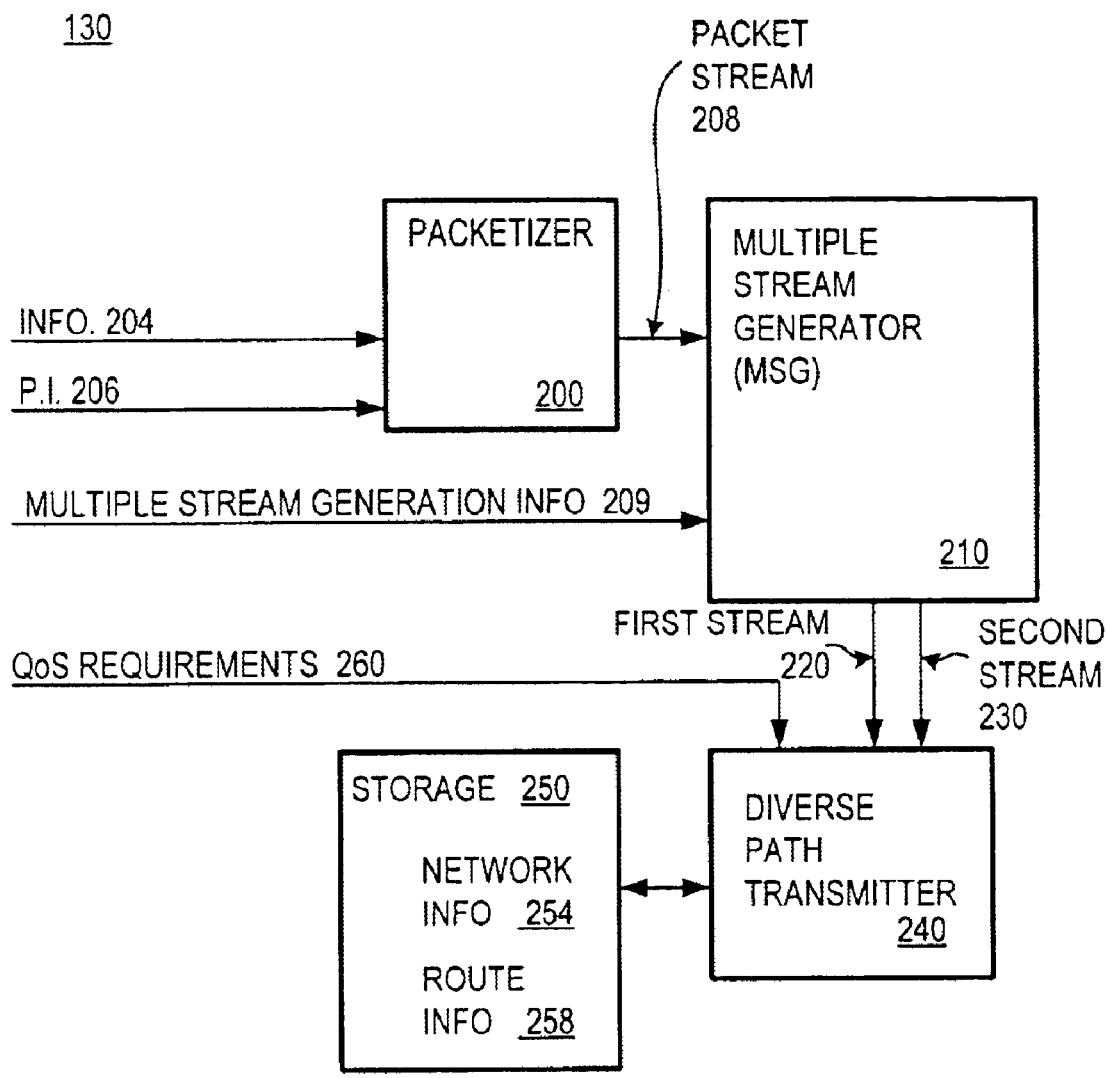
FIG. 2 illustrates in greater detail the transmitting device in accordance with one embodiment of the present invention.

FIG. 2 illustrates in greater detail the transmitting device 134 in accordance with one embodiment of the present invention. The transmitting device 134 (hereinafter also referred to as "sender") includes a packetizer 200 for receiving an information stream 204 (e.g., a stream of video frames) to be communicated and packetize information (PI) 206 from the sending application 110 and based thereon for generating a plurality 208 of packets (e.g., streaming video packets, audio packets or multimedia packets). The packetize information 206 can, for example, specify how a bit stream is to be split into packets (e.g., first 1000 bits into packet_1, next 1200 bits into packet_2, next 800 bits into packet_3, etc.). It is noted that the packetize information 206 depends on the specific application and can specify packets of fixed bit lengths or variable bit lengths.

The transmitting device 134 also includes a multiple stream generator (MSG) 210 that is coupled to the packetizer 200 for generating at least a first stream 220 and a second stream 230 in response to an information stream 208 (e.g., a stream of packets) and multiple stream generation information (MSGI) 209. The first stream can include a portion of the information stream, the entire information stream, or none of the information stream. Similarly, the second stream can include a portion of the information stream, the entire information stream, or none of the information stream.

In this example, the first stream can include a subset of packets (e.g., a first subset 220 of the packet stream 208), and the second stream can include the $N^{th}$ subset 230 of the packet stream 208). The MSG information 209 can specify which packets (e.g., subsets of packets) are sent over which paths. For example, a first subset of packets (group_1) is sent over path_1, a second subset of packets (group_2) is sent over path_2, etc.

It is noted that in other embodiments, the generation of multiple streams can occur prior to packetization. Moreover, the generation of multiple streams can occur before or after the information is encoded.

In the video context, the multiple streams can either be a series of encoded frames or original frames. For example, the MSG 210 can generate a first stream of odd frames and a second stream of even frames in response to an original stream of video frames. Alternatively, the MSG 210 can receive a stream of encoded video frames and responsive thereto, generate a first stream of encoded odd frames and a second stream of encoded even frames.

The transmitting device 134 also includes a diverse path transmitter 240 that is coupled to the MSG 210 for receiving the multiple streams (e.g., stream 220 and stream 230). The diverse path transmitter 240 is coupled to storage 250 (e.g., a memory) for accessing network information 254 and route information 258. The diverse path transmitter 240 can also receive quality of service requirements (QoS) 260 from the application (e.g., application 110). The quality of service requirements (QoS) 260 specify parameters, such as minimum required bandwidth, minimum acceptable packet loss, and minimum delay for a particular path. Based on the network information 254, route information 258, and quality of service requirements (QoS) 260, the diverse path transmitter 240 selectively transmits each subset of packets on a predetermined path (e.g., first path 160 and second path 170).

For example, the MSG 210 can partition the packets in the packet stream into at least a first stream 220 (e.g., a first subset of packets) and a second stream 230 (e.g., second subset of packets). Then, the diverse path transmitter 240 can send the first stream through a first path and the second stream through a second path. Alternatively, the MSG 210 can partition the packet stream into N different subsets of packets, where each subset is sent over a different path. It is noted that the first stream 220 and second stream 230 can have one or more packets in common, no packets in common, some information in common (e.g., different packets representing the same information, but encoded by utilizing a different encoding techniques or parameters), or no information in common.

Path Hopping Transmitter 1210

Figure 12:
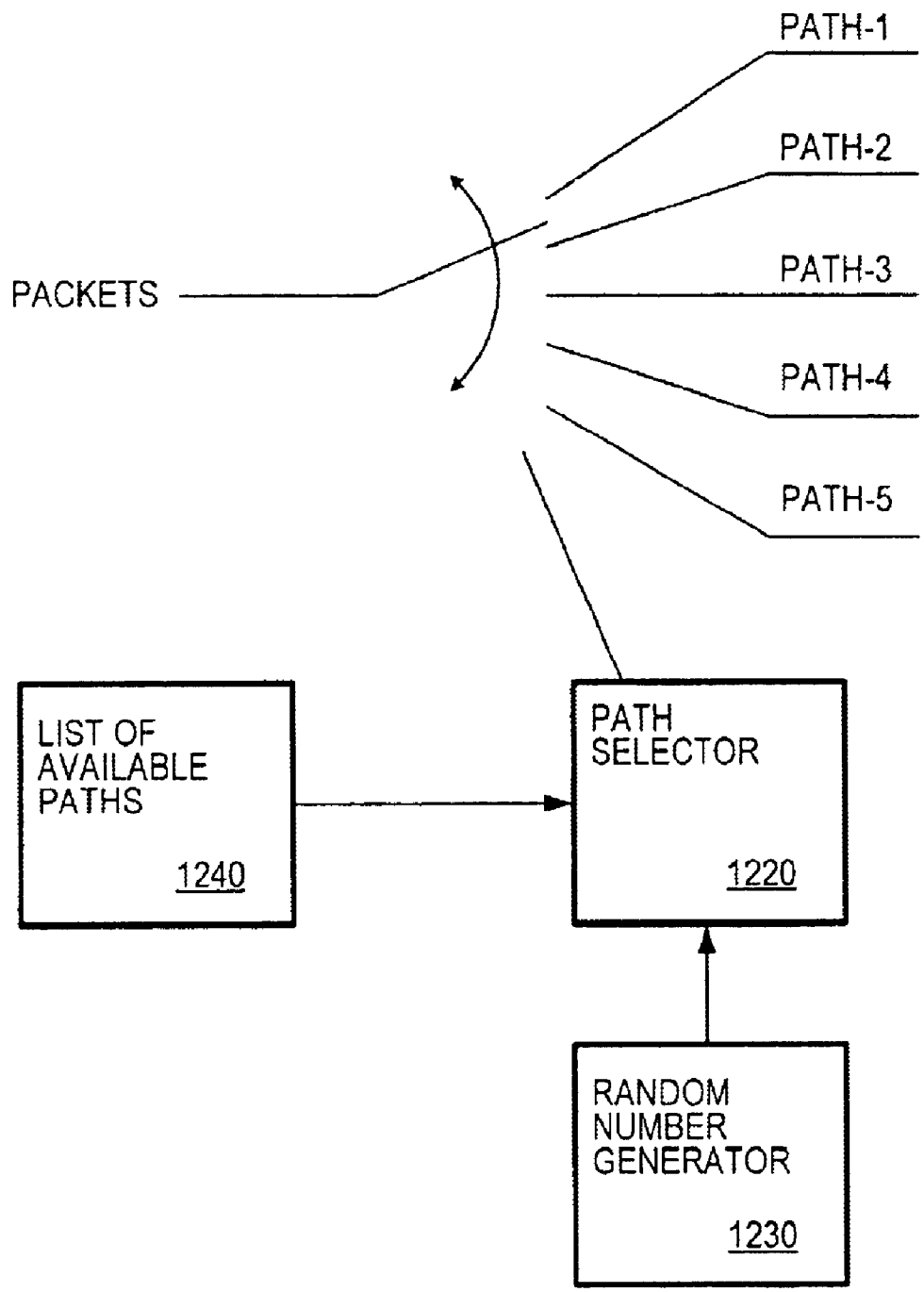
FIG. 12 is a block diagram of a transmitter that employs path-hopping path diversity in accordance with one embodiment of the present invention.

FIG. 12 is a block diagram of a transmitter 1210 that employs path-hopping path diversity in accordance with one embodiment of the present invention. The transmitter 1210 also includes a random number generator 1230 for generating random numbers (e.g., numbers 1 to N, where N represents the number of available paths). For example, in this embodiment, since there are five paths, N is equal to 5. Consequently, the random number generator 1230 generates a random number selected from the group of numbers (1, 2, 3, 4, and 5) and provides this random number to the path selector 1220. The transmitter 1210 also includes a list of available paths 1240. The list of available paths 1230 can be identified by utilizing different techniques described herein below. The transmitter 1210 includes a path selector 1220 for specifying a particular path for a subset of packets based on a received number.

In this path-hopping embodiment, the transmitter 1210 may select the particular path to send the next packet in a random or pseudo-random manner (i.e., the sequence of selected paths may be chosen in a random or pseudo-random manner). In this case there are a total of N paths available, and the path selector 1220 selects the appropriate path to send each packet based on the random number generated by the random number generator 1230 and the list 1240 of available paths.

In an alternative embodiment, the packets can be assigned to the paths in a deterministic sequential fashion. For example, the sender 130 may have available to it N paths, and the sender 130 then sends the first packet through path 1, the second packet through path 2, . . . , the Nth packet through path N, the N+1 packet through path 1, the N+2 packet through path 2, and so on.

Receiving Device 140

Figure 3:
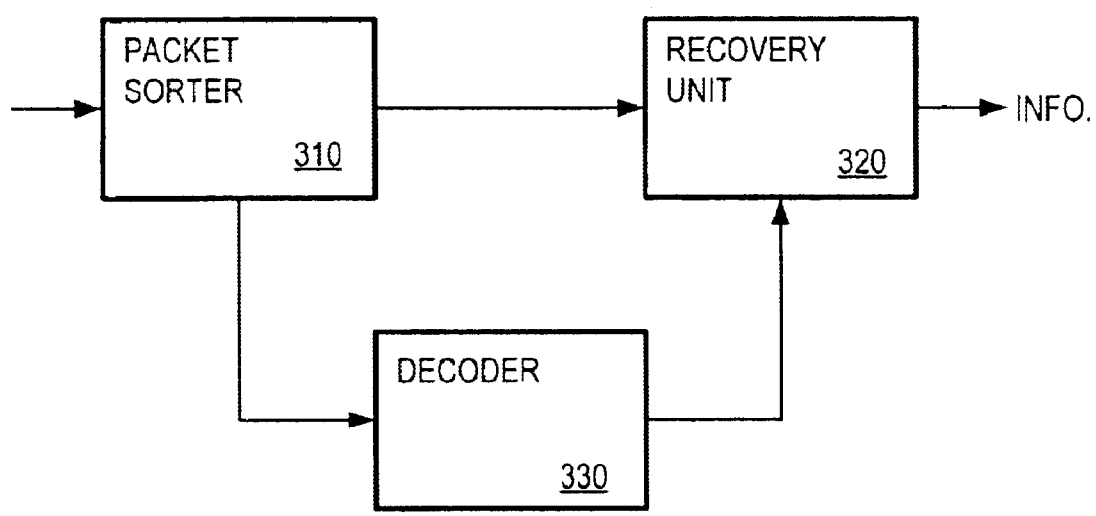
FIG. 3 illustrates in greater detail the receiving device in accordance with one embodiment of the present invention.

FIG. 3 illustrates in greater detail the receiving device 140 in accordance with one embodiment of the present invention. The receiving device 140 includes a packet sorter 310 for receiving the subsets of packets and sorting the packets to recover the original order of the packets. The receiving device 140 also includes a recovery unit 320 coupled to the packet sorter for receiving the packets in original order and for reconstructing the communicated information. A decoder 330 is also provided for un-compressing information in a compressed format.

In one embodiment, the receiving device 140 can be any conventional receiver. Specifically, the receiving device 140 does not have to be aware that path diversity is being employed and can operate in its conventional mode (i.e., as if a conventional single path were being used). Alternatively, the receiving device 140 may also employ additional functional blocks in order to improve the performance. For example, the receiving device 140 can be configured to track the communication quality of each path (e.g. packet loss, delay, possible outage, etc.) and communicate this information to the sender. The sender can then in turn use this information to optimize the transmission.

Path Diversity Through a Relay Infrastructure

Figure 4:
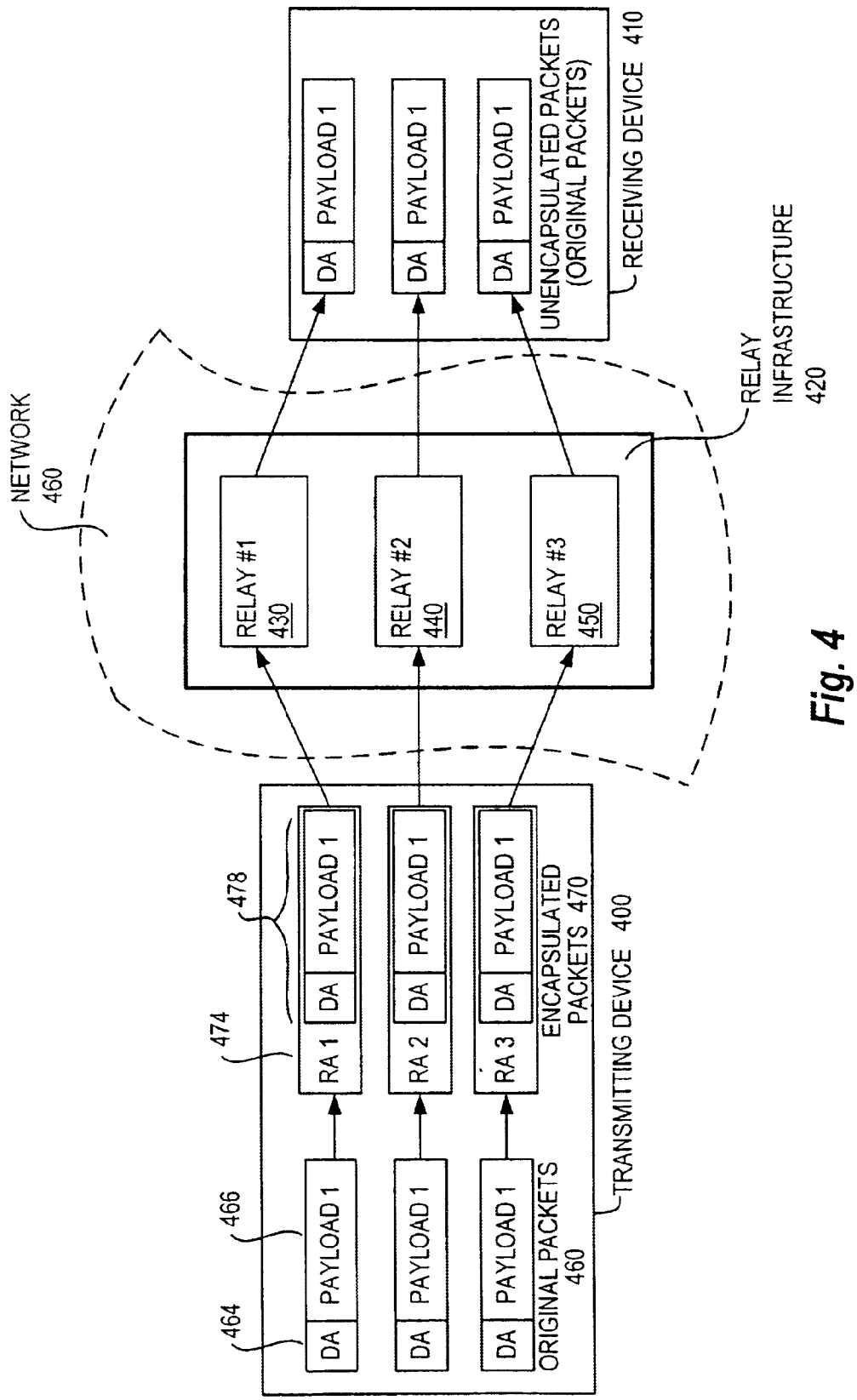
FIG. 4 is a block diagram of the path diversity mechanism that employs relays in accordance with one embodiment of the present invention.

FIG. 4 is a block diagram of the path diversity mechanism 134 that employs a relay infrastructure 420 in accordance with one embodiment of the present invention. In this embodiment, there is a transmitting device 400, a receiving device 410, and a relay infrastructure 420 that includes at least one relays (e.g., a first relay 430, a second relay 440 and a third relay 450). The transmitting device 400 sends a stream of packets over the network 460 (e.g., the Internet) by employing the relay infrastructure 420.

For example, the transmitting device 400 can partition the packet stream into three subsets of packets: 1) a first subset of packets {1, 4, 7, 10, . . . }, 2) a second subset of packets {2, 5, 8, 11, . . . }, and 3) a third subset of packets {3, 6, 9, 12, . . . }. Each subset of packets is sent through a different relay. Preferably, each of the original packets is encapsulated in another packet and sent to the appropriate relay address. For example, each original packet 460 includes a destination address field 464 and a payload 466. After encapsulation, each encapsulated packet 470 includes a header field 474 and a payload 478. The header field 474 contains the address of the corresponding relay (e.g., relay address RA_1, RA_2, and RA_3). The payload 478 contains the original packet (i.e., the destination address and the payload of the original packet).

At each relay, the following processing steps are performed. Each relay peels off its own address (i.e., the packet header 474) from the received packets and sends the contents 478 (i.e., the original packets) back on the network for delivery to the final destination. Alternatively, the relay may forward the packet to another relay, which forwards the packet to the final destination. At the receiving device 410, the original packets 460 are received.

The relay may also examine the destination address of the received packets and perform some type of processing, such as re-encapsulating the packet and sending the packet to another relay in the infrastructure 420 closer to the final destination. The architecture of the relay infrastructure 420 can also be optimized to suit a particular application.

Path Diversity through Source Routing

An alternative embodiment of the present invention employs Internet Protocol (IP) source routing to provide path diversity by routing different subsets of packets (within a packet stream) through different paths in a network to a final destination.

In this embodiment, the path diversity mechanism explicitly specifies the set of nodes for each packet to traverse. The set of nodes is referred to herein as the "source route". The path diversity mechanism can specify a subset of the nodes, which is referred to herein as "loose source routing" and described in greater detail hereinafter with reference to FIGS. 6–8. Alternatively, the path diversity mechanism can specify all the nodes, which is referred to herein as "strict source routing" and described in greater detail hereinafter with reference to FIG. 5. The path diversity mechanism achieves path diversity by explicitly specifying different source routes for different subsets of packets.

Each packet can have in its header the routing information (e.g., a list of addresses of the intermediate nodes of the particular traverse route). For example, the overhead for such a scheme is equal to the number of specified intermediate nodes times 32 bits/address for IPv4 or 128 bits/address for IPv6.

Path Definition

A path may be defined by specifying (1) all the nodes to be traversed (i.e., the complete route), or (2) a subset of all the nodes to be traversed (i.e., a partial route). When a subset of all the nodes in a route is specified, this subset may be (1) one or more nodes in the beginning portion of a route (the first hop(s)), (2) one or more nodes in the middle portion of a route (the middle hop(s)), (3) one or more nodes in the end portion of a route (the last hop(s)), or a combination of the above. It is noted that these different techniques for specifying the paths may be used irrespective of the manner in which the path diversity is actually achieved (i.e., irrespective of whether a system achieves path diversity via a relay infrastructure, via source routing, or via another approach).

Strict Source Routing

Figure 5:
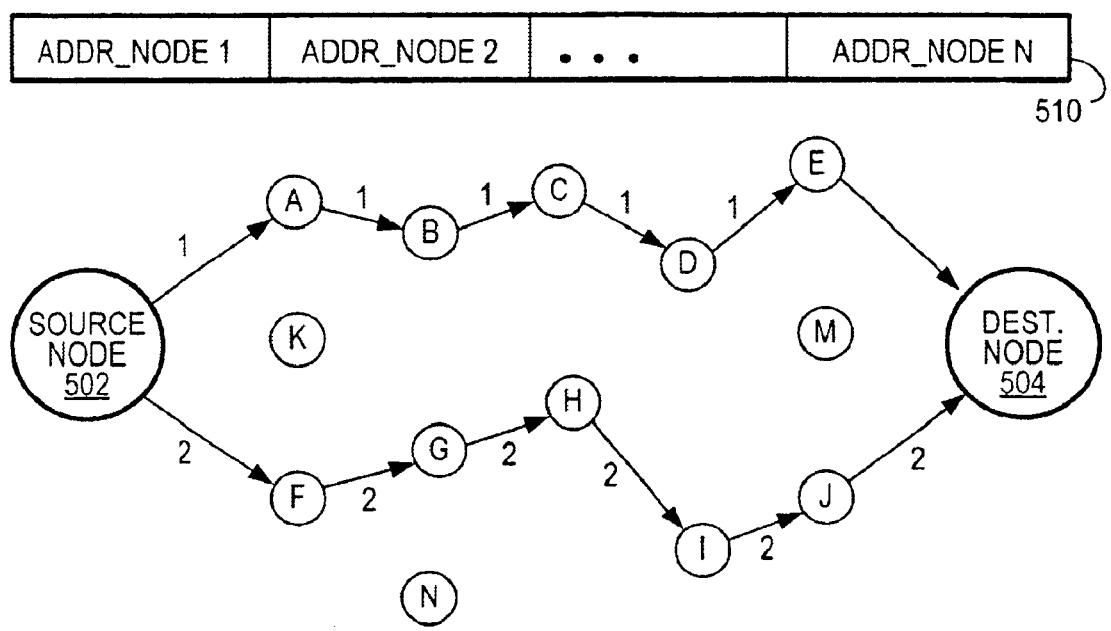
FIG. 5 is a block diagram of the path diversity mechanism that employs strict source routing in accordance with a second embodiment of the present invention.

FIG. 5 is a block diagram of the path diversity mechanism that employs strict source routing in accordance with a second embodiment of the present invention. The network includes a plurality of nodes (e.g., nodes a, b, c, d, e, f, g, h, i, j, l, m, and n) that are disposed between a source node 502 and a destination node 504. A path may be defined by specifying the nodes or hops for a particular route or traverse. In a strict source routing embodiment, the header 510 includes the addresses for every node in the route to completely specify the traverse. In this example, there are five intermediate nodes or hops. Accordingly, there are five addresses corresponding to the five intermediate nodes that are stored in the header 510.

A first stream (e.g., stream 220) can be sent along the path denoted with a "1", and a second stream (e.g., stream 230) can be sent along the path denoted with a "2". In this example, the first path is defined by nodes a, b, c, d, and e, and the second path is defined by nodes f, g, h, i, and j.

Loose Source Routing

Figure 6:
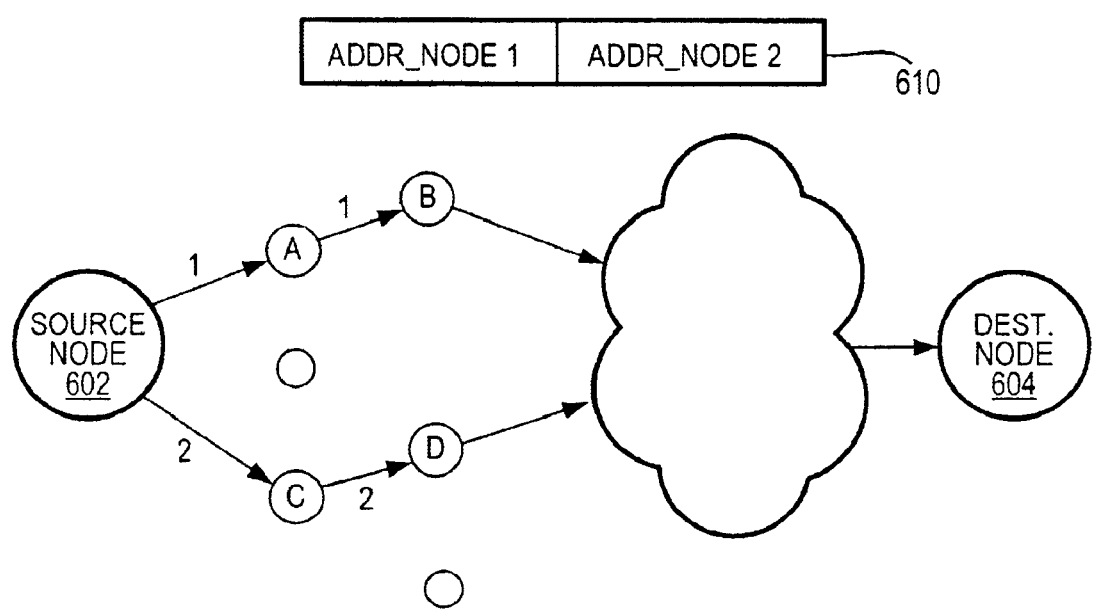
FIG. 6 is a block diagram of the path diversity mechanism that employs loose source routing to specify at least one node in the beginning of the path.

FIG. 6 is a block diagram of the path diversity mechanism that employs loose source routing to specify at least one node in the beginning portion of the route. Multiple paths may be defined by specifying one or more nodes that are disposed between a source node 602 and a destination node 604. Each packet can include a header 610 for storing one or more node addresses of a particular route. In this example, two nodes or hops in the beginning portion of the route are specified. Consequently, two addresses, corresponding to the two specified nodes in the beginning portion of the route, are stored in the header for each path.

A first stream of packets can be sent along the path (i.e., nodes a and b) denoted with a "1" for the first two hops. Similarly, the second stream of packets can be sent along the path (i.e., nodes c and d) denoted with a "2" for the first two hops. After the second node, the packets are then sent to the final destination based on the state of the routing tables of the nodes encountered between the last specified node and the destination.

Figure 7:
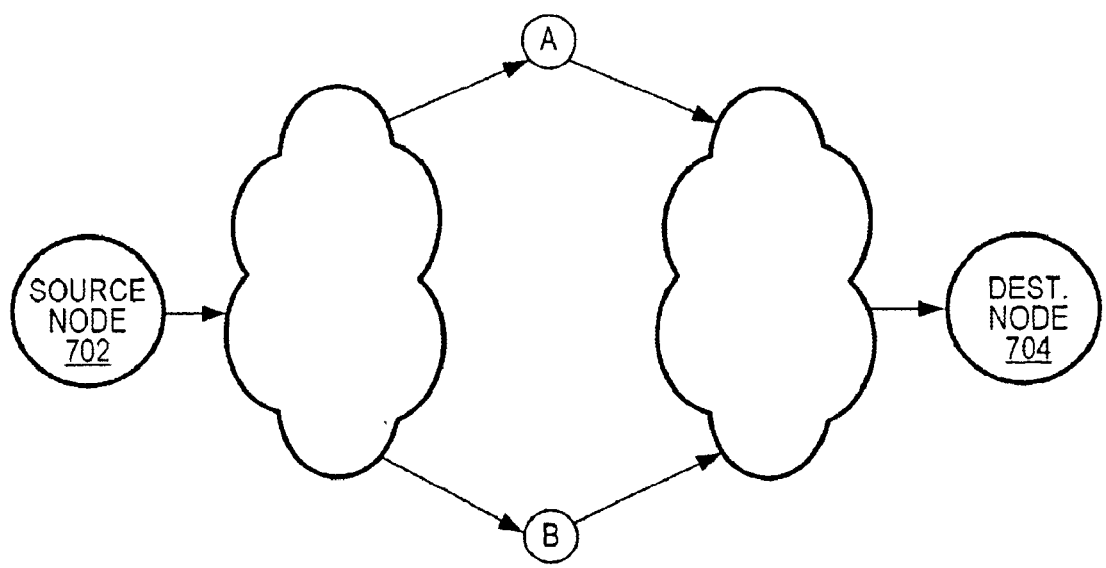
FIG. 7 is a block diagram of the path diversity mechanism that employs loose source routing to specify at least one node in the middle of the path.
Figure 8:
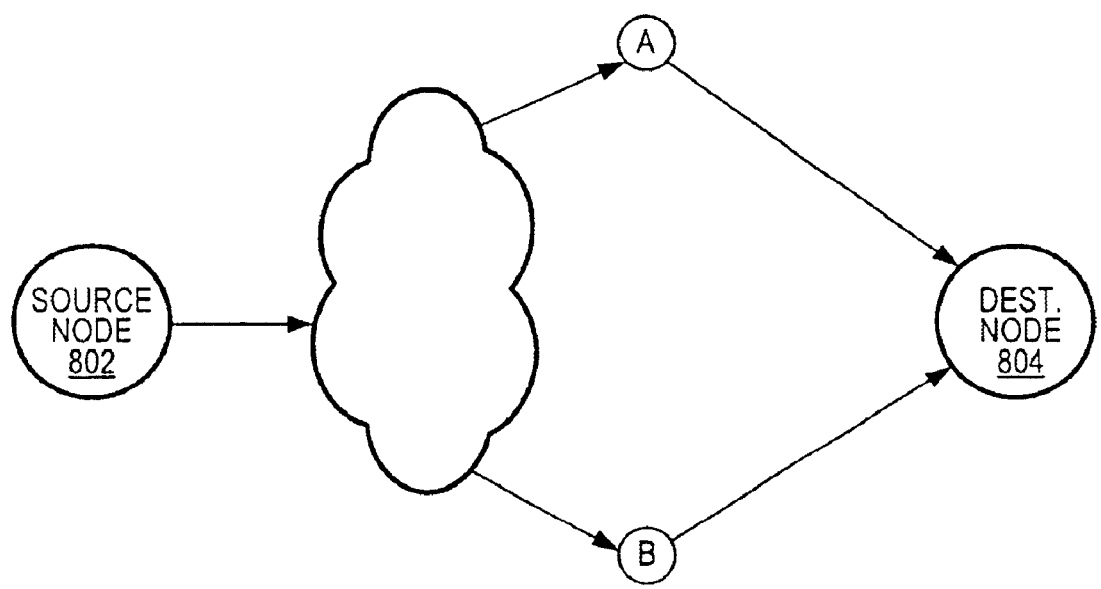
FIG. 8 is a block diagram of the path diversity mechanism that employs loose source routing to specify at least one node in the end of the route.

FIG. 7 is a block diagram of the path diversity mechanism that employs loose source routing to specify at least one node in the middle portion of the route. There are a plurality of paths defined by nodes disposed between a source node 702 and a destination node 704. FIG. 8 is a block diagram of the path diversity mechanism that employs loose source routing to specify at least one node in the end portion of the route. There are a plurality of paths defined by nodes disposed between a source node 802 and a destination node 804.

Achieving path diversity through source routing is especially suited for applications where network topology (e.g., the placement and connectivity of nodes (e.g., network devices) in the network), and network state (e.g., node addresses for each node in the network) are available. For example, corporate intranets, where the nodes, addresses corresponding to the nodes, and other network information are known, can advantageously implement such a scheme.

It is noted that the paths that are used to connect two nodes in a path diversity system may be changed with time. Specifically, the paths that are chosen at the beginning of a connection are not necessarily fixed throughout the connection. Instead, the paths may be changed during the connection. For example, if congestion or outages occurs in certain paths, it may be necessary to replace those problematic paths with other clean paths. Furthermore, the number of paths that are used to connect two points in a path diversity system may be changed with time. Specifically, the number of paths that are chosen at the beginning of a connection is not necessarily held fixed throughout the connection and may be dynamically modified during the connection. For example, in certain cases it may be desirable to reduce the number of paths used if the quality of all the paths is good, where quality is measured in terms of packet loss, bandwidth, and delay. On the other hand, if the quality of the paths is poor, it may be desirable to increase the number of paths used.

An example of changing the paths during a connection is now described. A connection may start by using only a single path. If the quality of that path degrades (or if a higher quality path is desired than the quality available with the single path), the present invention can dynamically choose to employ two paths. The present invention may also increase the number of paths to three or four. At a later time, if it is determined that the quality, provided by using a specific single path, is sufficient, then the present invention can dynamically switch to using only that specific single path for the connection.

It is further noted that conventional channel coding techniques, such as Forward Error Correction Coding (FEC) or interleaving of data or packets, can be applied to the packets in each individual path or to packets across a number of paths. For example, FEC can be applied to the packets in an individual path to degenerate redundant packets (e.g. parity packets) which are sent over that same path. Alternatively, FEC can be applied to packets across a number of paths, e.g. FEC can be applied to one packet from path 1, one packet from path 2, . . . , one packet from path N, to create a redundant packet (e.g. parity packet) to be transmitted in path N+1.

It is also noted that the various paths do not all have to be used simultaneously. For example, the following scenarios are all possible. In a first scenario, multiple paths can be used where all of these paths are used simultaneously. In a second scenario, multiple paths are used where only one of these paths is used at a time. In a third scenario, multiple paths are used where a subset of these paths is used at any point in time.

The path diversity mechanism can be implemented to provide a layer of service for reliable communication across a packet network in accordance with one embodiment of the present invention. A packet network, such as the Internet, typically provides a "best effort" level of service as described earlier. One aspect of the path diversity mechanism of the present invention is that it provides a reliable communication service by building on top of and leveraging the "best effort" level of service.

Path Diversity Processing

Figure 9:
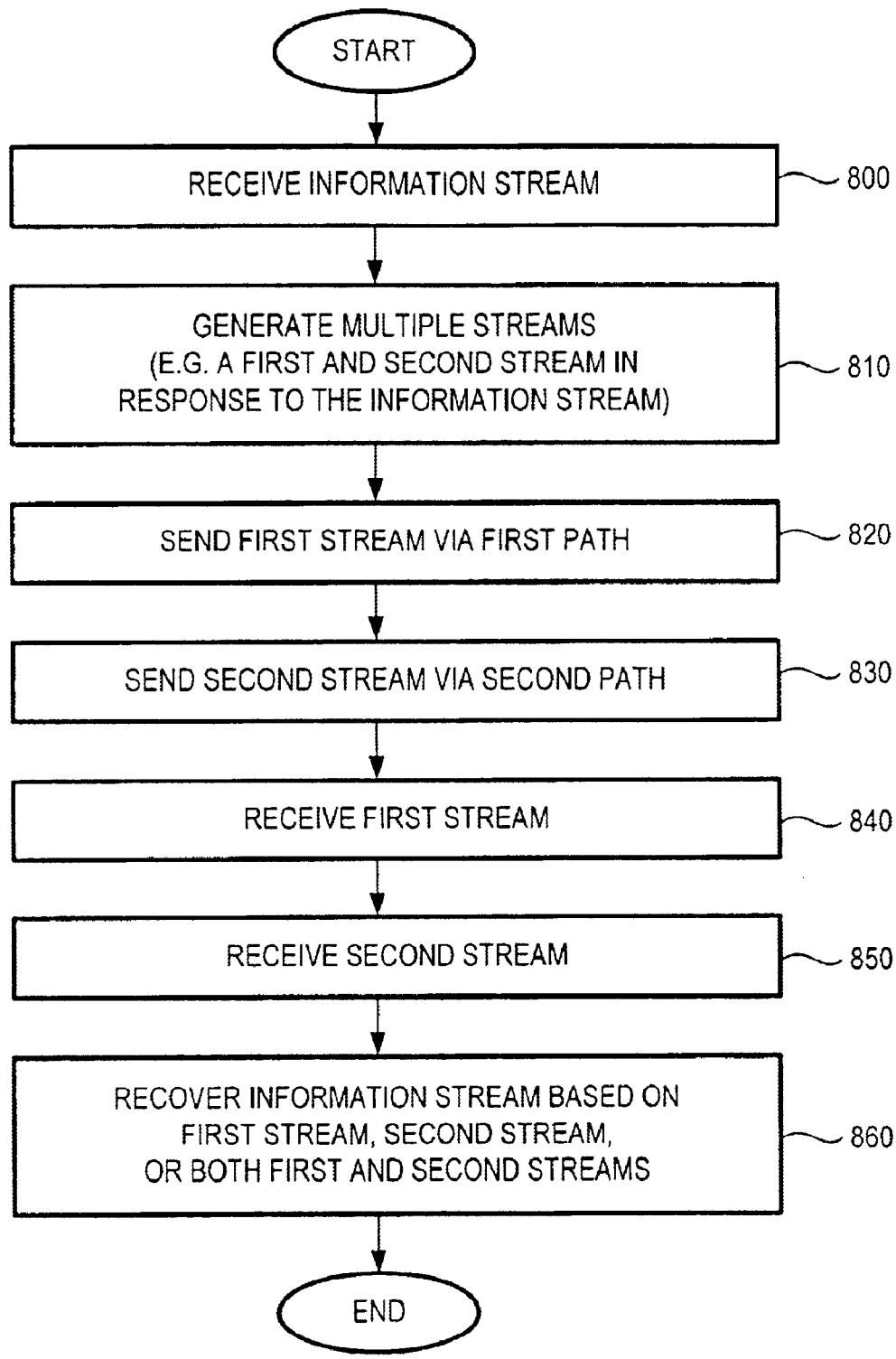
FIG. 9 illustrates a flow chart of the processing steps performed by the path diversity mechanism in accordance with one embodiment of the present invention.

FIG. 9 illustrates a flow chart of the processing steps performed by the path diversity mechanism in accordance with one embodiment of the present invention. In step 800, an information stream (e.g., a bit stream) to be communicated is received all at once, or one frame at a time (e.g., in real-time). For example, the information stream can be a video stream that is generated by an image capture device (e.g., a digital video camera) or provided by a storage device. In step 804, at least a first stream and a second stream is generated in response to the information stream. It is noted that multiple streams can be generated in response to the information stream. The information stream can be packetized before or after the generation of multiple streams. Furthermore, the information stream can be encoded before or after the generation of multiple streams.

For example, when the multiple stream generation occurs after packetization, a plurality of packets can be grouped into a first subset of packets and a second subset of packets, where the first subset and the second subset are not necessarily disjoint.

In step 820, the first stream is transmitted or sent through a first path. In step 830, the second stream is transmitted or sent through a second path. During initialization, the source first performs path identification in order to learn about the different available paths. Before the source begins sending the different substreams of packets along different paths, the source employs various different path identification techniques that are described herein below to identify the available paths. The "source" can refer to any the sender (e.g., a personal computer (PC), cellular telephone, a server, etc.).

In one embodiment, the source has a network map that describes the network connectivity (i.e., which nodes are connected to which other nodes), as well as, the congestion along each network link. In this case, the source itself decides which paths to employ for transmission.

In an alternative embodiment, the path identification is performed somewhere in the network or infrastructure that is away from the source (hereinafter referred to as non-source path identification), thereby making this step largely transparent to the source. One advantage of this approach is that the design of the source can be simplified since the source need not track the network configuration.

Non-source Path Identification

Two general approaches are possible to perform the path identification in the network (away from the source) and thereby make the source simpler. These approaches can be described as a direct and an indirect approach. In the direct approach the sending application directly sends the different substreams of packets through the different paths. In the indirect approach the sending application does not directly send the different substreams of packets through the different paths, instead the packets are forwarded to another node that sends the packets through the different paths.

Indirect Approach

Figure 10:
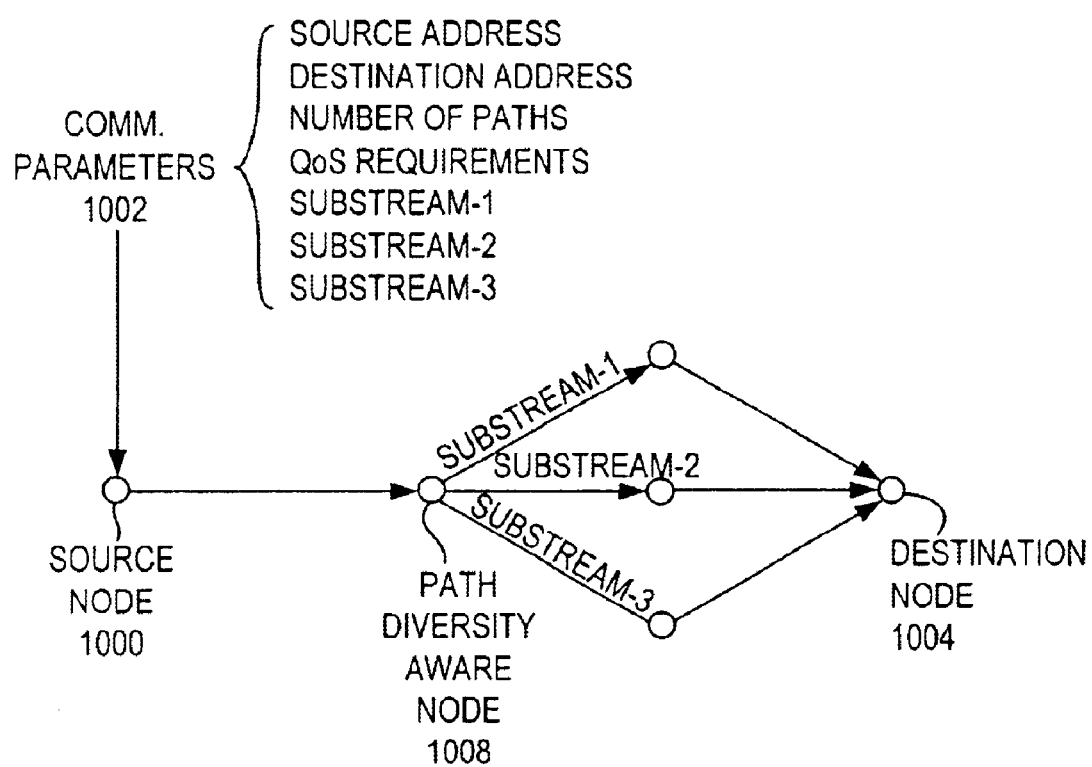
FIG. 10 is a block diagram of an indirect path identification mechanism in accordance with another embodiment of the present invention.

FIG. 10 is a block diagram of an indirect path identification mechanism in accordance with another embodiment of the present invention. A source node 1000 sends communication parameters 1002 to a path diversity aware node 1008. The path diversity aware node 1008 in turn sends sub-streams (e.g., sub-stream_1, sub-stream_2, sub-stream_3) through different paths to a destination node 1004. It is noted that the source itself can be a path diversity aware node.

In the indirect approach, an application, executing at the source node 1000, identifies each packet as belonging to one of a number of substreams by including a substream identifier at the beginning of the packet. All the packets are sent to a path-diversity aware node 1008 that receives the packets and then sends each substream of packets through an appropriate path. For example, an application can send to the path-diversity aware node 1008 communication parameters 1002, such as the source address, destination address, the desired number of paths (e.g., three paths as shown), the QoS requirements for each path, and the three substreams of packets. In response, the path-diversity aware node 1008 sends each of these substreams along an appropriate path. In this approach the path-diversity aware node 1008 has knowledge of the possible paths and sends the different substreams of packets through the different paths. However, the application has minimal knowledge about the different paths, thereby simplifying the design of the sender.

The application and the path-diversity aware node 1008 can negotiate to determine an appropriate combination of number of paths, QoS for each path, and available paths, before beginning the connection, as well as make changes during the connection based on the communication conditions between the sender and receiver.

Direct Approach

Figure 11:
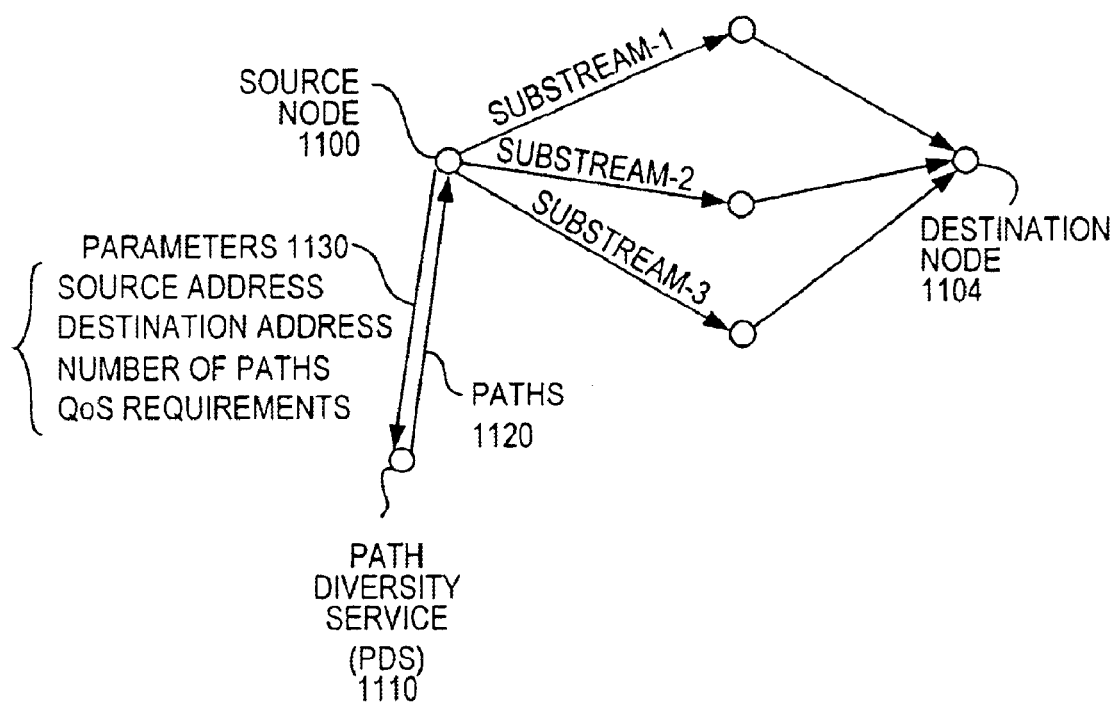
FIG. 11 is a block diagram of a direct path identification mechanism in accordance with one embodiment of the present invention.

FIG. 11 is a block diagram of a direct path identification mechanism in accordance with one embodiment of the present invention. A source node 1100 sends sub-streams (e.g., sub-stream_1, sub-stream_2, sub-stream_3) through different paths to a destination node 1104. In the direct approach, the source 1100 first learns the various paths and then sends the various sub-streams of packets through the different paths. In this embodiment, the source notifies a Path-Diversity Service (PDS) 1110 that it would like to communicate to a particular destination via N paths. In response, the path-diversity service 1110 informs the source of the appropriate paths 1120 to use. Specifically, the source 1100 notifies the path-diversity service 1110 of certain parameters 1130. These parameters 1130 can include, for example, the source address, destination address, the number of paths desired, and any Quality of Service (QoS) requirements for each path (e.g., required bandwidth, maximum tolerable delay, maximum tolerable packet loss, etc.). The path diversity service 1110 then informs the source 1100, which are the appropriate paths 1120 to use. The specific description of which paths to use depends on that manner in which path diversity is achieved (i.e., whether path diversity is achieved via relay architecture or via source routing). It is noted that the source 1100 and path-diversity service 1110 can negotiate to determine an appropriate combination of a number of paths, QoS for each path, and available paths.

For example, if the source uses two paths, then the requirements of those two paths are different than the requirements when the source uses three paths. Through the negotiation, the application and path diversity service can identify and match appropriate application-level processing with a number or choice of paths.

It is noted that the initialization steps and path identification techniques described above can be applied to any of the previously described embodiments of the present invention regardless of the specific manner employed to achieve path diversity. In other words, the path identification techniques described above can be applied to a system that uses a relay infrastructure or a system that employs source routing to achieve diversity. In either case, the application may be given information (e.g., addresses) for a number of relays or nodes for each path. For example, if N paths are chosen, the application may receive information for one relay for each path or a sequence of relays to use to create each path.

Referring again to FIG. 9, in step 840, the first stream is received. In step 850, the second stream is received. In step 860, the information is recovered based on the first stream, the second stream, or a combination thereof.

Connections to the Source

In certain instances, a source may be connected to the rest of the world via a number of connections. For example, a company can have connections with multiple Internet Service Providers (ISPs) for fault tolerance. For example, when one ISP has a catastrophic failure or goes bankrupt, the company can simply switch to using one of the other ISPs without disrupting its operations.

In this case, path diversity can be achieved by directing different streams of packets to each of the different ISPs. Since each ISP has its own local network, sending different streams of packets to each ISP corresponds to each stream traversing a separate path.

In certain instances, a source may be connected to the rest of the world via a number of technologies. For example, a source may be connected via a conventional wired network, a cellular network, and a satellite link. In this case, path diversity can be achieved by directing different streams of packets through each of the different technologies. Since each technology has its own network, sending different streams of packets to each technology corresponds to each stream traversing a separate path. For example, one stream of packets may be sent via a satellite link while another stream of packets may be sent via a conventional wired link. These two streams traverse different paths.

In a cellular environment, a source may be able to connect to multiple base stations. In this case, the source can send a different stream to each base station, thereby sending each stream over a separate path.

In communicating to a client in a wireless (e.g. wireless LAN) or cellular environment, the destination may be able to receive data from multiple transmitters at the same time. Therefore, by sending different streams through the different transmitters, the destination can receive the data from different paths.

This is an example of when the infrastructure decides how to deliver the information to the destination. The infrastructure can identify that the destination can receive data from multiple transmitters, and therefore, transmits different streams of packets through the different transmitters.

In an environment similar to Digital Television, one stream of data may be broadcast over the wireless spectrum, and another stream transmitted over a wired network, such as cable.

In a different scenario, one stream may be broadcast over a wireless channel (similar to television), and separate wireless transmitters may be placed in different hard-to-reach areas. The separate wireless transmitters are then employed to transmit a different stream. This scenario is especially useful in areas where there are mountains, skyscrapers, other obstacles or barriers.

In the above scenarios, the different streams typically contain different subsets of packets. However, in certain cases it may be beneficial to send the same packets in more than one stream.

The path diversity mechanism provides a number of benefits. First, the application (e.g., applications 110 and 120) sees a virtual average path that exhibits a smaller variability in communication quality than the variability that exists over any individual path. Second, burst packet losses are converted to isolated packet losses. Third, the probability of an outage (i.e., where all the packets in the packet stream are lost for the duration of the outage) is greatly reduced. These benefits simplify real-time multimedia system design and can significantly enhance real-time video communication performance.

In the foregoing specification, the invention has been described with reference to specific embodiments thereof. It will, however, be evident that various modifications and changes may be made thereto without departing from the broader scope of the invention. The specification and drawings are, accordingly, to be regarded in an illustrative rather than a restrictive sense.

What is claimed is:

1. A method for communicating information from a sender to a receiver through a network having a first path and a second path comprising:

receiving an information stream;

generating at least a first subset of packets and a second subset of packets in response to the information stream;

establishing path diversity by sending the first subset of packets along the first path and sending the second subset of packets along the second path; and dynamically changing the path diversity during transmission based on the communication conditions during a connection between a sender and a receiver.

2. The method of claim 1 further comprising the steps of:

receiving the first subset of packets;

receiving the second subset of packets;

recovering the information stream based on the first subset of packets, and second subset of packets, or both the first subset of packets and the second subset of packets.

3. The method of claim 1 wherein the step of sending the first subset of packets along the first path includes identifying the first path by employing a path diversity service; and wherein the step of sending the second subset of packets along the second path includes identifying the second path by employing a path diversity service.

4. The method of claim 1 wherein the step of sending the first subset of packets along the first path and the step of sending the second subset of packets along the second path includes providing a source address, a destination address, a number of paths, the first stream and the second stream to a path diversity aware node;

the path diversity aware node identifying a first path and a second path, and the path diversity aware node sending the first subset of packets along the first path and sending the second subset of packets along the second path.

5. The method of claim 1 further comprising:

dynamically changing the number of paths based on the communication conditions between the sender and receiver.

6. The method of claim 1 further comprising:

dynamically changing at least one node of the first path or the second path based on the communication conditions between the sender and receiver.

7. The method of claim 1 wherein the network includes a first relay having a first address and a second relay having a second address;

wherein the step of sending the first subset of packets along the first path includes sending the first subset of packets along the first relay by addressing the first subset of packets with the first address; and wherein the step of sending the second subset of packets along the second path includes sending the second subset of packets along the second relay by addressing the second subset of packets with the second address.

8. The method of claim 1 wherein the step of sending the first subset of packets along the first path includes specifying a first source route for the first subset of packets; and sending the first subset of packets along the first source route; and wherein the step of sending the second subset of packets along the second path includes specifying a second source route for the second subset of packets; and sending the second subset of packets along the second source route.

9. The method of claim 1 wherein the network is a cellular telephone network, a packet network, an Internet, an Intranet, a local area network, a wireless local area network, a wireless local area conforming to IEEE 802.11 specifications, or a local area network conforming to Bluetooth specifications.

10. The method of claim 1 wherein the information is one of text information, file information, video information, audio information, voice information, multimedia information, control information, time sensitive information, time-sensitive video information, time-sensitive video information, and time-sensitive voice information, time-sensitive multi-media information, and time-sensitive control information.

11. A system for communicating information through a network comprising:

a sender for receiving an information stream to be communicated;

a multiple stream generator for generating multiple streams that include at least a first stream and a second stream in response to the information stream; and a path diversity unit coupled to the multiple stream generator for receiving the first stream and the second stream and for establishing path diversity by sending the first stream through a first path in the network and sending the second stream through a second path in the network;

wherein the path diversity unit dynamically changes the path diversity during transmission based on the communication conditions during a connection between the sender and a receiver.

12. The system of claim 11 further comprising:
a receiver for receiving the first stream and receiving the second stream; and
a recovery unit for recovering the information stream based on the first stream, the second stream, or both the first stream and the second stream.

13. The system of claim 12 wherein the receiver can be one of a receiver that has no knowledge about path diversity transmission and a receiver that includes a mechanism for tracking the communication quality of each path and communicating the communication quality of each path to the sender for use in optimizing the transmission.

14. The system of claim 11 wherein the network includes a first relay having a first address and a second relay having a second address; and
wherein the path diversity unit sends the first stream through the first relay by addressing the first stream with the first address; and sends the second stream through the second relay by addressing the second stream with the second address.

15. The system of claim 11 wherein the sender includes
an IP source router for specifying a first source route for the first stream, sending the first stream along the first source route, specifying a second source route for the second stream, and sending the second stream along the second source route.

16. The system of claim 15 wherein the first source route is one of a loose source route that specifies a subset of nodes of the route and a strict source route that specifies all the nodes of the route; and wherein the second source route is one of a loose source route that specifies a subset of nodes of the route and a strict source route that specifies all the nodes of the route.

17. The system of claim 11 wherein the network is a cellular telephone network, a packet network, the Internet, an Intranet, a local area network, a wireless local area network, a wireless local area conforming to IEEE 802.11 specifications, or a local area network conforming to the Bluetooth specifications.

18. The system of claim 11 wherein the information is one of text information, file information, video information, audio information, voice information, multimedia information, control information, time-sensitive information, time-sensitive video information, time-sensitive video information, time-sensitive voice information, time-sensitive multi-media information, and time-sensitive control information.

19. The system of claim 11 wherein the path diversity unit performs sending the first stream and the second stream through a first path and second path, respectively, by employing a path diversity aware node.

20. The system of claim 11 wherein the path diversity unit specifies one of all nodes to be traversed and a subset of nodes to be traversed; and
wherein the subset of nodes can include one of at least one node in the beginning portion of the path, at least one node in the middle portion of the path, and at least one node in the end portion of the path.

21. The system of claim 11 wherein the path diversity unit dynamically changes at least one node of the first path or second path during transmission in response to communication conditions between the sender and receiver.

22. The system of claim 11 wherein the path diversity unit dynamically changes the number of paths employed during transmission in response to communication conditions between the sender and receiver.

23. The system of claim 11 having multiple paths and multiple streams; wherein the path diversity unit assigns streams to paths in one of a deterministic fashion, random fashion, and pseudo-random fashion.

24. The system of claim 11 further comprising:
at least two different Internet Service Providers for connecting the sender to the network;
wherein the path diversity unit achieves path diversity by sending different streams to each of the different Internet Service Providers.

25. The system of claim 11 further comprising:
at least two different connection technologies for connecting the sender to the network;
wherein the path diversity unit achieves path diversity by sending a first stream through a first connection technology and sending a second stream through a different connection technology.

26. The system of claim 11 wherein the different connection technologies include a satellite link, a wired link, a wireless link, and a cellular link.

27. The method of claim 11 allowing an application to specify to one of a sender and a path diversity service at least one QoS parameter for each substream of packets.

28. The system of claim 11 wherein the sender applies one of
Forward Error Correction Coding to a packet sent along one of the paths and across packets sent along multiple paths and
interleaving to a packet sent along one of the paths and across packets sent along multiple paths.

29. The system of claim 11 wherein the first stream and the second stream are dependent on each other; and wherein the sender applies interleaving and Forward Error Correction Coding to a packet sent along one of the paths and across packets sent along multiple paths.

30. The system of claim 11 wherein the sender employs path-hopping path diversity.

31. The system of claim 30 wherein the path diversity unit assigns streams to paths in one of a deterministic fashion, random fashion, and pseudo-random fashion.

32. A system for communicating information through a network comprising:
a sender for receiving an information stream to be communicated;
a multiple stream generator for generating multiple streams that include at least a first stream and a second stream in response to the information stream; and
a path diversity unit coupled to the multiple stream generator for receiving the first stream and the second stream and for establishing path diversity by sending the first stream through a first path in the network and sending the second stream through a second path in the network, wherein the path diversity unit performs path selection by employing a path diversity service that selects a path in response to path parameters; and
wherein the path diversity unit dynamically changes the path diversity during transmission based on the communication conditions during a connection between the sender and a receiver.

33. The system of claim 32 wherein the path parameters can include a source address, destination address, number of paths, and quality of service requirements for each path; and wherein the quality of service requirements for each path can include bandwidth, delay and packet loss.

34. A method for communicating information from a sender to a receiver through a network having a first path and a second path comprising:

receiving an information stream;

generating at least a first subset of packets and a second subset of packets in response to the information stream;

establishing path diversity by sending the first subset of packets along the first path by specifying a first source route for the first subset of packets and sending the first subset of packets along the first source route; and sending the second subset of packets along the second path by specifying a second source route for the second subset of packets and sending the second subset of packets along the second source route, wherein the first source route is one of a loose source route that specifies a subset of nodes of the route and a strict source route that specifies all the nodes of the route; and wherein the second source route is one of a loose source route that specifies a subset of nodes of the route and a strict source route that specifies all the nodes of the route, and dynamically changing the path diversity during transmission based on the communication conditions during a connection between a sender and a receiver.

* * * * *